United States Patent
Glick et al.

(10) Patent No.: US 7,002,473 B2
(45) Date of Patent: Feb. 21, 2006

(54) LOSS PREVENTION SYSTEM

(76) Inventors: Larry D. Glick, 6209 Hancock Ave., San Jose, CA (US) 95123-4624; Renee A. Glick, 6209 Hancock Ave., San Jose, CA (US) 95123-4624

( * ) Notice: Subject to any disclaimer, the term of this patent is extended or adjusted under 35 U.S.C. 154(b) by 68 days.

(21) Appl. No.: 10/736,584

(22) Filed: Dec. 17, 2003

(65) Prior Publication Data

US 2005/0134459 A1 Jun. 23, 2005

(51) Int. Cl.
*G08B 13/14* (2006.01)

(52) U.S. Cl. .................. 340/572.1; 340/572.4

(58) Field of Classification Search ............ 340/539.1, 340/539.11, 539.19, 539.21, 539.23, 572.1, 340/572.4, 572.8, 573.1, 573.4, 573.6, 5.8, 340/10.1
See application file for complete search history.

(56) References Cited

U.S. PATENT DOCUMENTS

| | | | | |
|---|---|---|---|---|
| 4,918,425 A | * | 4/1990 | Greenberg et al. | 340/539.3 |
| 5,289,163 A | | 2/1994 | Perez et al. | 340/539.3 |
| 5,748,087 A | | 5/1998 | Ingargiola et al. | 340/573.7 |
| 5,748,454 A | * | 5/1998 | Nichols et al. | 361/814 |
| 5,949,335 A | * | 9/1999 | Maynard | 340/572.1 |
| 6,002,344 A | * | 12/1999 | Bandy et al. | 340/10.2 |
| 6,064,309 A | * | 5/2000 | Sellers et al. | 340/573.6 |
| 6,297,737 B1 | | 10/2001 | Irvin | 340/571 |
| 6,577,238 B1 | | 6/2003 | Whitesmith | 340/572.1 |
| 6,842,106 B1 | * | 1/2005 | Hughes et al. | 340/5.8 |
| 6,847,892 B1 | * | 1/2005 | Zhou et al. | 701/213 |
| 2002/0080036 A1 | | 6/2002 | Rabanne et al. | |
| 2002/0126010 A1 | | 9/2002 | Trimble et al. | |
| 2002/0145520 A1 | | 10/2002 | Maloney | |
| 2003/0034887 A1 | | 2/2003 | Crabtree | |
| 2003/0063003 A1 | | 4/2003 | Bero et al. | |

FOREIGN PATENT DOCUMENTS

EP          1 288 878 A2    3/2003

* cited by examiner

*Primary Examiner*—Van T. Trieu
(74) *Attorney, Agent, or Firm*—Richard C. Litman

(57) ABSTRACT

The loss prevention system is a system to prevent articles from becoming lost, misplaced, or stolen. The articles are tagged with, or contain, an identifying device such as an RFID tag or a wireless network interface. The identifying device allows the articles to be monitored by a monitor. The monitor periodically interrogates each identifying device with a transmitted RF signal, and generates an alarm signal if an interrogated identifying device does not reply or is out of range. The identifying devices can be acquired by the monitor and associated with an alias that can be used to associate the identifying device with its associated article.

19 Claims, 15 Drawing Sheets

LOSS PREVENTION SYSTEM

BACKGROUND OF THE INVENTION

1. Field of the Invention

The present invention relates to a system for monitoring personal possessions. More specifically, the present invention is a loss prevention system wherein a monitor continuously and automatically surveils electronically tagged personal possessions and sounds an alarm when one or more tagged possessions is removed from proximity to the monitor.

2. Description of the Related Art

The loss of personal possessions is a problem that has spawned numerous and diverse solutions. Small articles, such as a cell phone or pager, television remote controller, briefcase, umbrella, and other articles too numerous to count may be easily lost if carelessly misplaced or accidentally left behind.

One solution to the problem is illustrated by the many "finder" systems that have been devised, wherein an alarm tag is fastened to an article and sounds when commanded by a signal, such as a radio signal, from an alarm control station. When the article is lost, a signal is broadcast from a base station to activate the alarm tag and sound the alarm. The article may then be found by following the sound of the alarm tag.

U.S. Pat. No. 6,297,737, issued on Oct. 21, 2001 to D. Irvin, discloses an object locating system. The system includes a locating unit that comprises a wireless communication interface for transmitting signals to one or more locating tags. When a tagged item is misplaced, a signal is transmitted from the locating unit. When the tag receives the signal, an alarm is sounded. Additionally, the tag sends a response that is received by the locating unit to give an indication that the tagged item is nearby, even if the audio alarm cannot be heard. The system is bi-directional so that a tagged item can be used to find the locating unit itself in the event that the locating unit is misplaced.

U.S. Patent Publication No. 2003/0034887, published on Feb. 20, 2003, discloses an article locator system that employs a tracking transceiver and a handheld locator device. The tracking transceiver is attached to the article to be tracked and sends a response when interrogated by the handheld locator device. The handheld locator device determines the distance and/or direction to the tracking transceiver.

U.S. Patent Publication No. 2002/0126010, published on Sep. 12, 2002, discloses an object locator system employing radio frequency (RF) signaling.

While article finder systems can be a great help in finding lost articles, or even in keeping track of pets and children, the above described article finder systems are typically used in reaction to a loss and not in a manner to prevent the loss. Typical of the article finder systems is the need to manually initiate an action to find the lost article. Additionally, the article finder tags require a power source such as a battery to continuously power a receiver and to power an alarm or transmitter. The article finder tags cease to function when their battery dies, rendering them useless.

Instead of locating an article after it is lost, it is preferable in many circumstances to prevent the loss of the article. Thus, a loss prevention system that signals when an article is removed from a given area, or that signals when an article is left behind, is desirable to help in preventing the article from becoming lost.

European Patent Application 1,288,878, published on Mar. 5, 2003, discloses a security apparatus comprising a base station that interacts with an RFID security tag. The base station comprises an RF transmitter, receiver, and antenna, along with a control unit. The control unit sends a monitoring signal that is received by the RFID tag. The RFID tag is inductively powered by the monitoring signal and responds with an identity signal. Because of the limited range of the monitoring signal and the identity signal, removal of the RFID security tag from proximity to the base station causes the identity signal not to be received by the base station. Thus, when the base station sends a monitoring signal but no identity signal is received in response, an alarm is sounded. In this manner, the security apparatus functions to sound an alarm when a tagged item is removed from proximity to the base station.

U.S. Pat. No. 6,577,238, issued on Jun. 10, 2003 to H. Whitesmith et al., discloses a system for monitoring the position of one or more RFID tags. The system has a detector that incorporates circuitry for detecting changes in the range of an RFID tag from the detector and for triggering an alarm if the range exceeds a predetermined threshold or if the RFID tag cannot be detected by the detector. Range may be determined by measuring the time of a returned radio signal from a tag, by measuring the strength of a returned radio signal from a tag, or by detecting changes in a periodic interval at which a signal is transmitted by a tag.

U.S. Patent Publication No. 2002/0080036, published on Jun. 27, 2002, discloses a system for tracking possessions. The system includes a plurality of child units, each having a transceiver for receiving a control signal and sending a locator signal. The system also includes a parent unit that has a transceiver for communicating with the child units and a processor for monitoring the child units. The system incorporates a GPS receiver in both the parent and child units so that the parent unit can determine the position of, and relative direction and distance to, a child unit.

U.S. Patent Publication No. 2002/0145520, published on Oct. 10, 2002, discloses an object tracking system for tracking the removal of objects from a location and the replacement of the objects at the location. The system includes an RFID tag attached to each of the objects to be tracked. A storage unit has a plurality of receptacles configured to receive objects replaced at the location. Each receptacle has an associated antenna for activating the RFID tag of an object placed in the receptacle.

U.S. Pat. No. 5,289,163, issued on Feb. 22, 1994 to C. Perez et al., discloses a child position monitoring and locating device that monitors the position of a child by detecting the signal strength of a radio frequency carrier from a transmitter attached to the child. If the radio signal is too weak, an alarm notifies the adult that the child is too far away.

U.S. Pat. No. 5,748,087, issued on May 5, 1998 to T. Ingargiola et al., discloses a remote personal security alarm system.

U.S. Patent Publication No. 2003/0063003, published on Apr. 3, 2003, discloses a proximity monitoring communication system wherein an alarm is triggered in a master communication device in a local area network when a slave device in the local area network has strayed from the proximity of the local area network.

None of the above inventions and patents, taken either singly or in combination, is seen to describe the instant invention as claimed. Thus a loss prevention system solving the aforementioned problems is desired.

SUMMARY OF THE INVENTION

The loss prevention system of the present invention functions to prevent articles from becoming lost, misplaced, or stolen. The articles are tagged with an RFID tag, and tracked by a monitor. The monitor periodically interrogates each RFID tag with a transmitted RF signal, and generates an alarm signal if an interrogated tag does not reply or is out of range.

The monitor may be a small and portable device, carried or worn by a person. Thus, a person can affix a tag to commonly carried items, such as a camera, keys, a briefcase, wallet, laptop computer, personal digital assistant (PDA), and others. With the monitor also carried, worn, or clipped to the person's belt, an alarm will be sounded if any of the tagged items are left behind or removed from the vicinity of the person. Alternatively, the monitor could be placed in a fixed location, or built into a storage cabinet or shelf or the like, to monitor valuables.

The tags are passive, semi-passive, or active RFID tags that respond, when interrogated by the monitor, with a unique identification code. The passive tags contain no power source, deriving power inductively from the RF signal transmitted by the monitor. The range of a passive tag varies from a few inches to a few meters, depending on the monitor power output, the sensitivity of the monitor's receiving antenna, the operating frequency, the antenna designs of both the monitor and the tag, and other factors. Semi-passive tags include a battery or power source to power a transmitter in response to the RF signal transmitted by the monitor, allowing the tag to send its reply over a longer distance. Active tags employ a battery or power supply that powers the tag's receiver, transmitter, and other circuitry, allowing a more sensitive receiver and providing a transmitter with higher power to give the active tag a maximum range. Thus, passive, semi-passive, or active RFID tags may be employed individually or in combination to provide for short, medium, or long usable range with a given monitor or to alleviate technological limitations.

The monitor stores an identification code for each tag that is to be monitored. Each tag may be stored along with a name or an alias to identify the tag to the user, so that if a tagged item is removed from the vicinity of the monitor, the tag's name or alias can be displayed along with the alarm in order to help to identify the item. Each tag may also have a specified sensitivity that defines the distance threshold beyond which the alarm is sounded. In addition to the maximum physical range for each type of tag, a tag's distance from the monitor may be determined or approximated based on the received tag signal strength, time delay in receiving the tag's response to interrogation, or by other methods. Thus, a different distance threshold may be set, for example, for a tagged wallet versus a tagged briefcase so that the wallet tag will trigger an alarm if the wallet falls from the user's pocket, while the briefcase tag will not cause an alarm until the user has left the briefcase a significant distance behind.

The monitor employs a microcontroller to operate the monitor transceiver, to manage the tags, and to drive a user interface. The microcontroller allows the user to interactively add or remove the tag identification codes from the monitor memory, and to activate and deactivate stored tags.

Accordingly, it is a principal object of the invention to provide a loss prevention system that sounds an alarm when an electronically tagged article is removed from a predefined area.

It is another object of the invention to provide a loss prevention system that monitors tagged articles to sound an alarm when a tagged article is removed from the vicinity of a system monitor.

It is a further object of the invention to provide a loss prevention system wherein RFID tags can be easily added to or removed from the system.

It is a still further object of the invention to provide a loss prevention system wherein RFID tags can be easily activated and deactivated.

Still another object of the invention is to provide a loss prevention system wherein RFID tags can be assigned a sensitivity level so that an alarm is sounded when the tag is at a distance from the monitor that is less than the tag's maximum functional distance.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
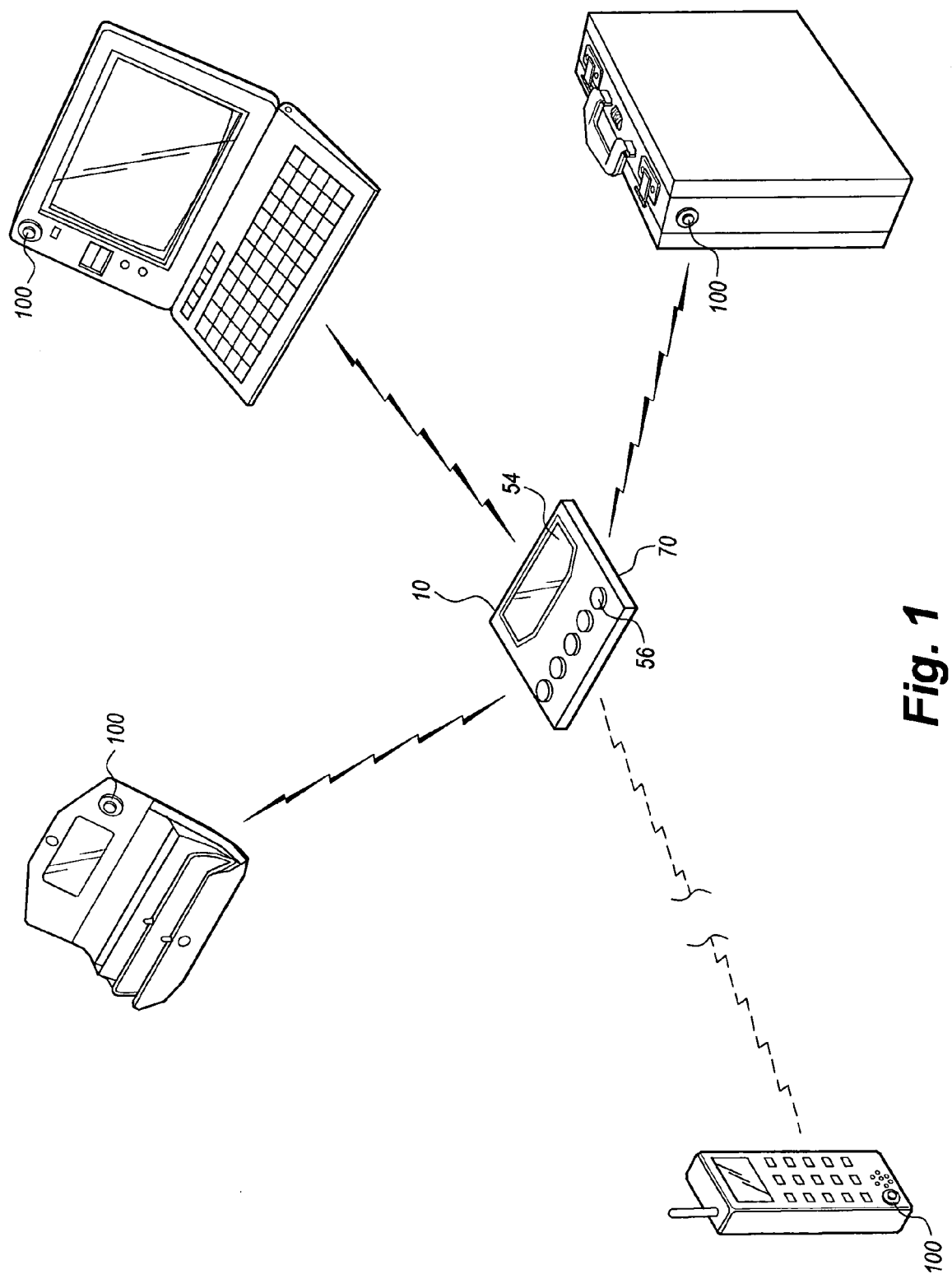
FIG. 1 is a diagrammatic view of a loss prevention system according to the present invention.

The present invention is a loss prevention system for monitoring tagged articles and issuing an alarm when a tagged article is removed from proximity to a monitor. Illustrated in FIG. 1, the loss prevention system includes a monitor 10, which may also be referred to as an interrogator or reader, that communicates with Radio Frequency IDdentification (RFID) tags ("tags") 100, which may also be referred to as transponders, that may be affixed to, or contained within, numerous personal articles to prevent the loss of the articles.

The monitor 10 periodically interrogates the tags 100, sending an RF signal that is received by the tags 100. When interrogated, the tags 100 send a response to the monitor 10, the response including a unique identification code. The monitor 10 verifies that each tag 100 responds to the interrogation. If a known tag 100 does not respond to the interrogation, the monitor 10 sounds an alarm. Thus, given a finite distance that the monitor 10 can transmit its interrogation signal, as well as a (typically shorter) finite range that the tag 100 can transmit its response, when a tag 100 is removed a sufficient distance away from the monitor 10, the monitor 10 will no longer receive the tag's response and will therefore sound an alarm for the tag 100.

Figure 2A:
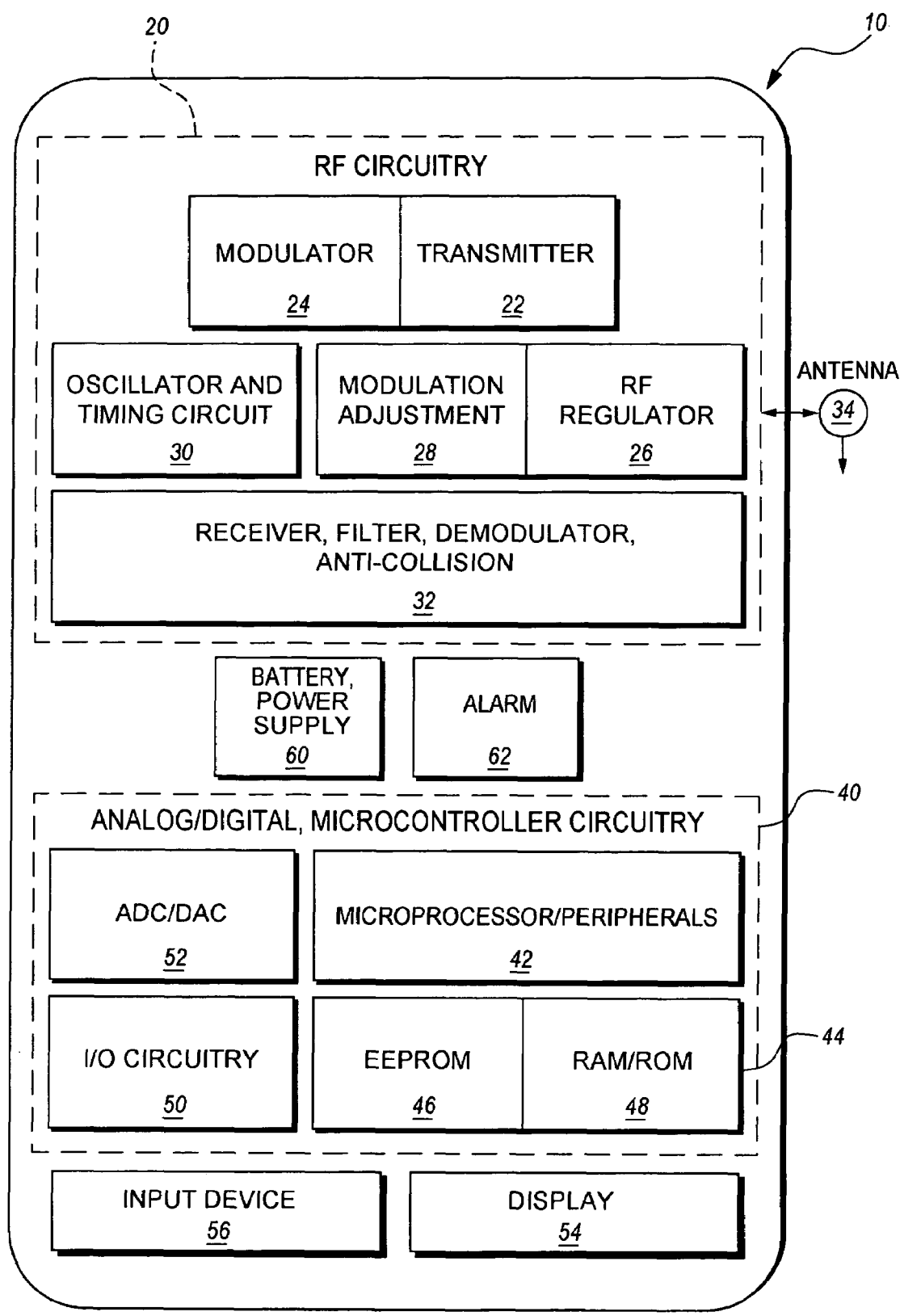
FIG. 2A is a block diagram of a monitor for a loss prevention system according to the present invention.
Figure 2B:
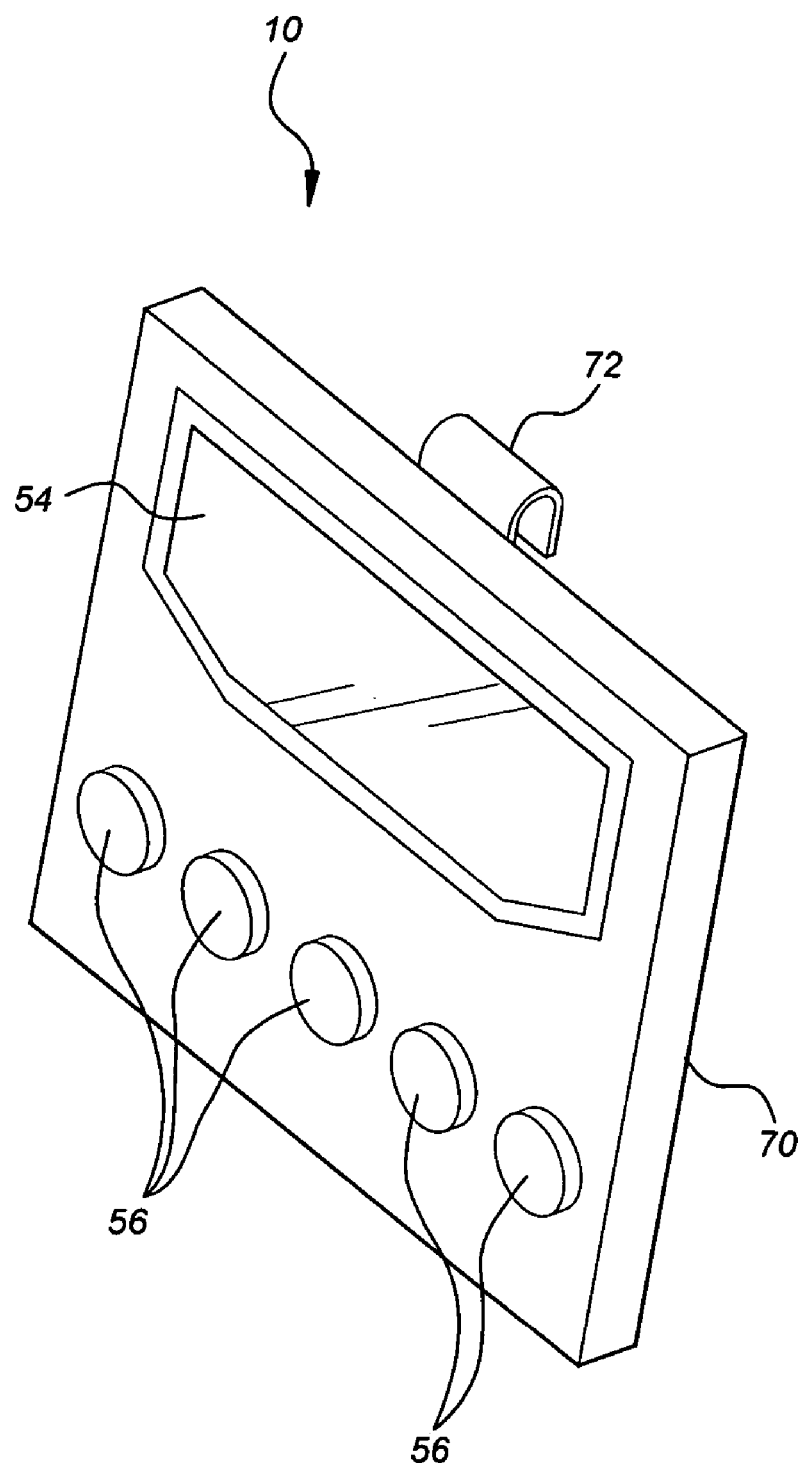
FIG. 2B is a perspective view of a monitor for a loss prevention system according to the present invention.

Turning to FIGS. 2A and 2B, the monitor 10 includes RF circuitry 20 for communicating with the tags 100, and control circuitry 40 for controlling the RF circuitry 20, managing tag identification codes, monitoring the tags 100, and interacting with a user. The RF circuitry 20 and control circuitry 40 are contained in a housing 70, along with a user interface. The user interface includes a display 54, such as a plurality of simple light emitting diodes (LED), alphanumeric LEDs, a flat panel display such as a liquid crystal display (LCD), or other display type, along with an input device 56 such as a plurality of pushbuttons, a touch screen function incorporated in the display, a keyboard, or a device for voice control. A flat panel LCD display is preferred. For portable use, the housing 70 may include a belt clip 72, or other means of attaching the monitor 10 to a user or the user's clothing.

The monitor's RF circuitry 20 includes a modulator 24 and transmitter 22, along with an RF regulator 26, a modulation adjustment circuit 28, and oscillator and timing 30 circuits to generate, encode, and transmit the interrogation signal. Additionally, the RF circuitry 20 includes receiver, filtering, demodulating, and anti-collision circuitry 32 to receive the responses from the tags 100 and to resolve collisions when two or more tags 100 reply at the same time. An antenna 34 is connected to transmitter 22 and receiver 32.

The monitor's control circuitry 40 includes a microprocessor 42 and memory 44, including random access and read only memory (RAM/ROM) 48, and an electrically erasable programmable read only memory (EEPROM) 46. The control circuitry 40 may also include I/O circuitry 50, and analog-to digital and digital-to-analog converters (ADC/DAC) 52. The monitor's control circuitry 40 is best implemented with a micro-controller device wherein the above-described circuitry is combined within a single integrated circuit or device. Microcomputer program code is stored in the memory 44, and controls the operation of the monitor 10.

An alarm 62, connected to the microcontroller, provides an audible, visual, or tactile alarm signal. The alarm 62 may be a speaker or buzzer or other sound source, a light source, a vibrator, or a combination of these. A battery or power supply 60 provides power for the monitor 10.

The microcomputer program code controls the operation of the monitor's RF circuitry 20, directing the RF circuitry 20 to send an interrogation signal to the tags 100 and processing replies from the tags 100. Additionally, the microcomputer program code performs management of the tag identification codes, and performs user interface functions related to setup and operation of the monitor 10.

Figure 3A:
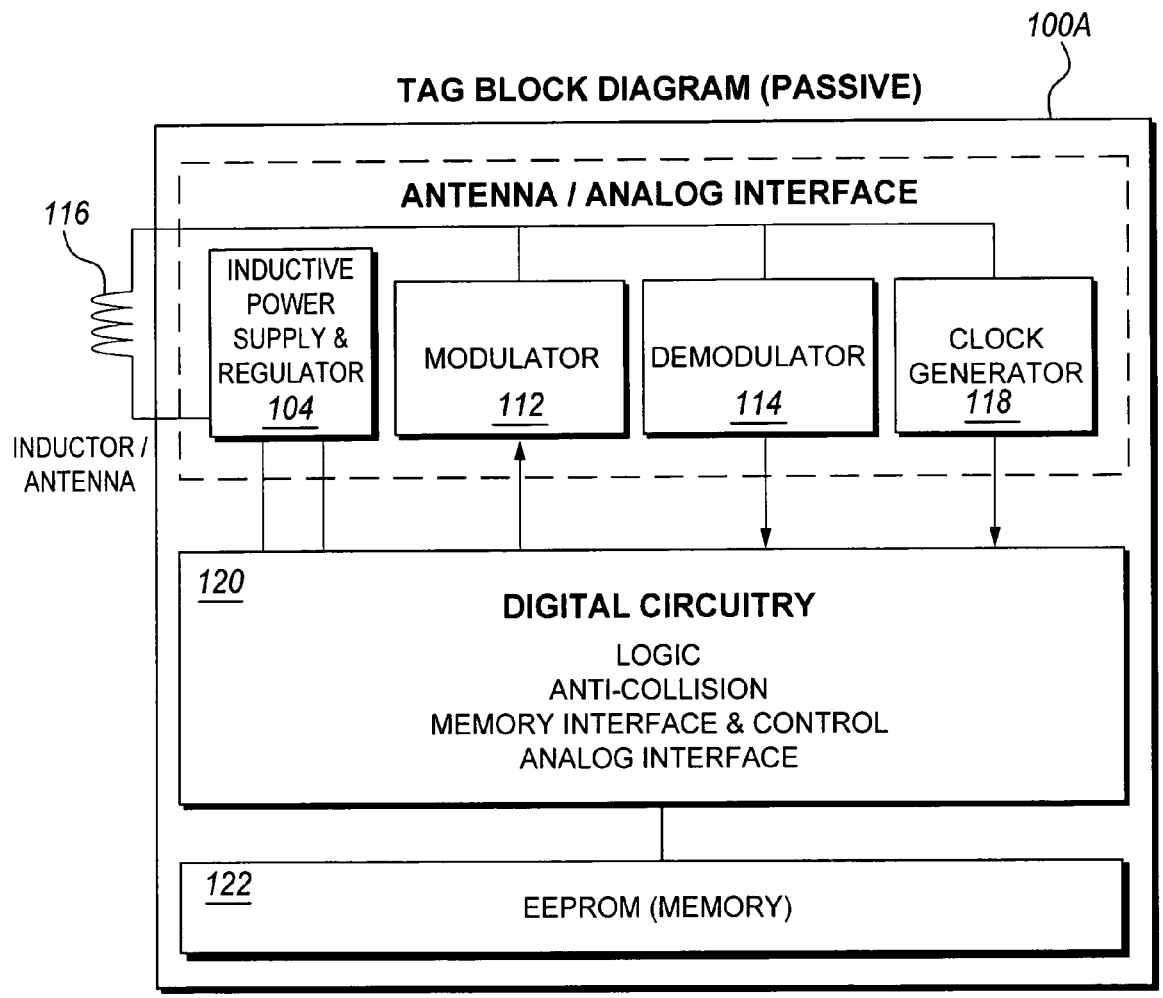
FIG. 3A is a block diagram of a passive RFID identification tag for a loss prevention system according to the present invention.
Figure 3B:
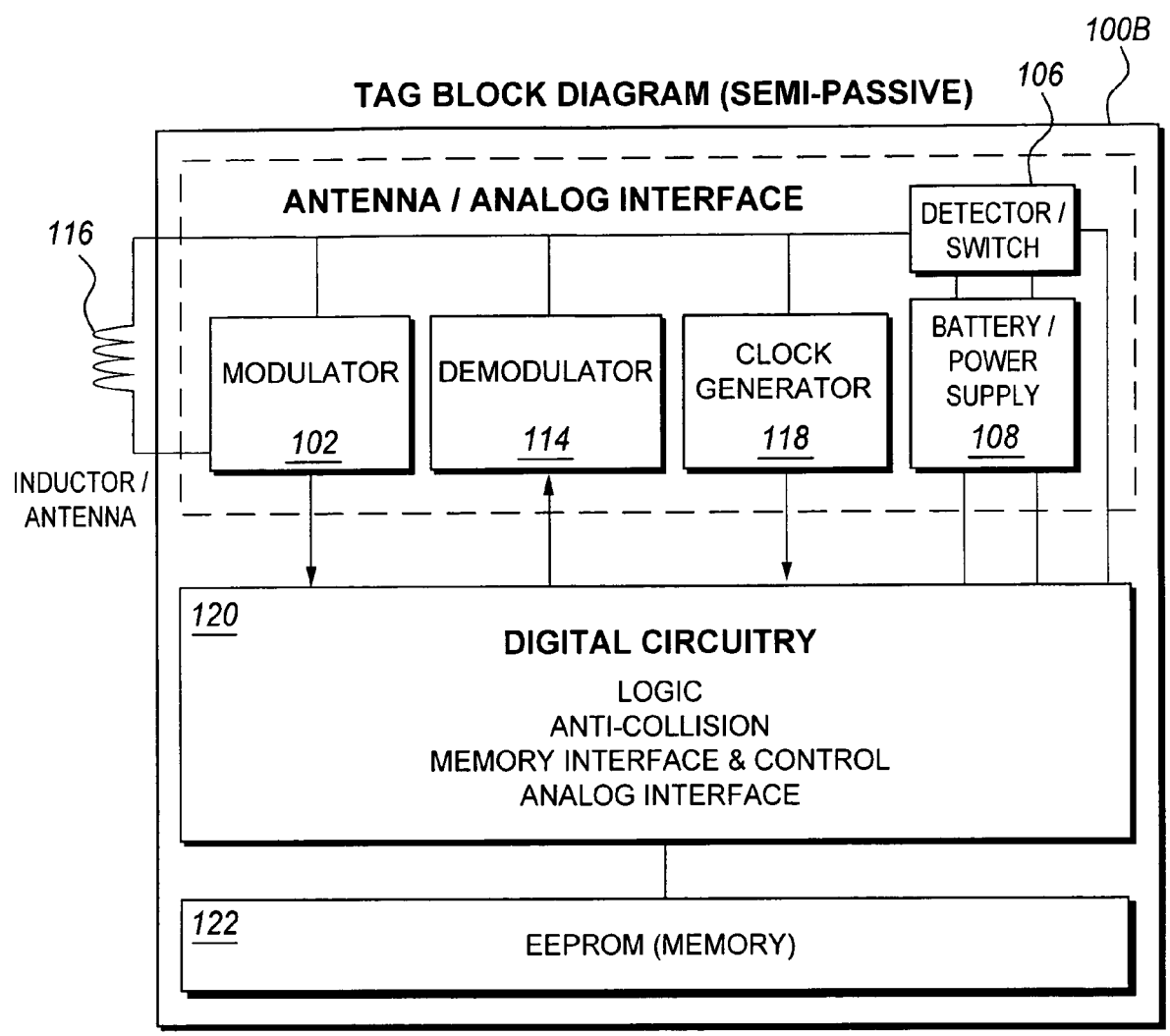
FIG. 3B is a block diagram of a semi-passive RFID identification tag for a loss prevention system according to the present invention.
Figure 3C:
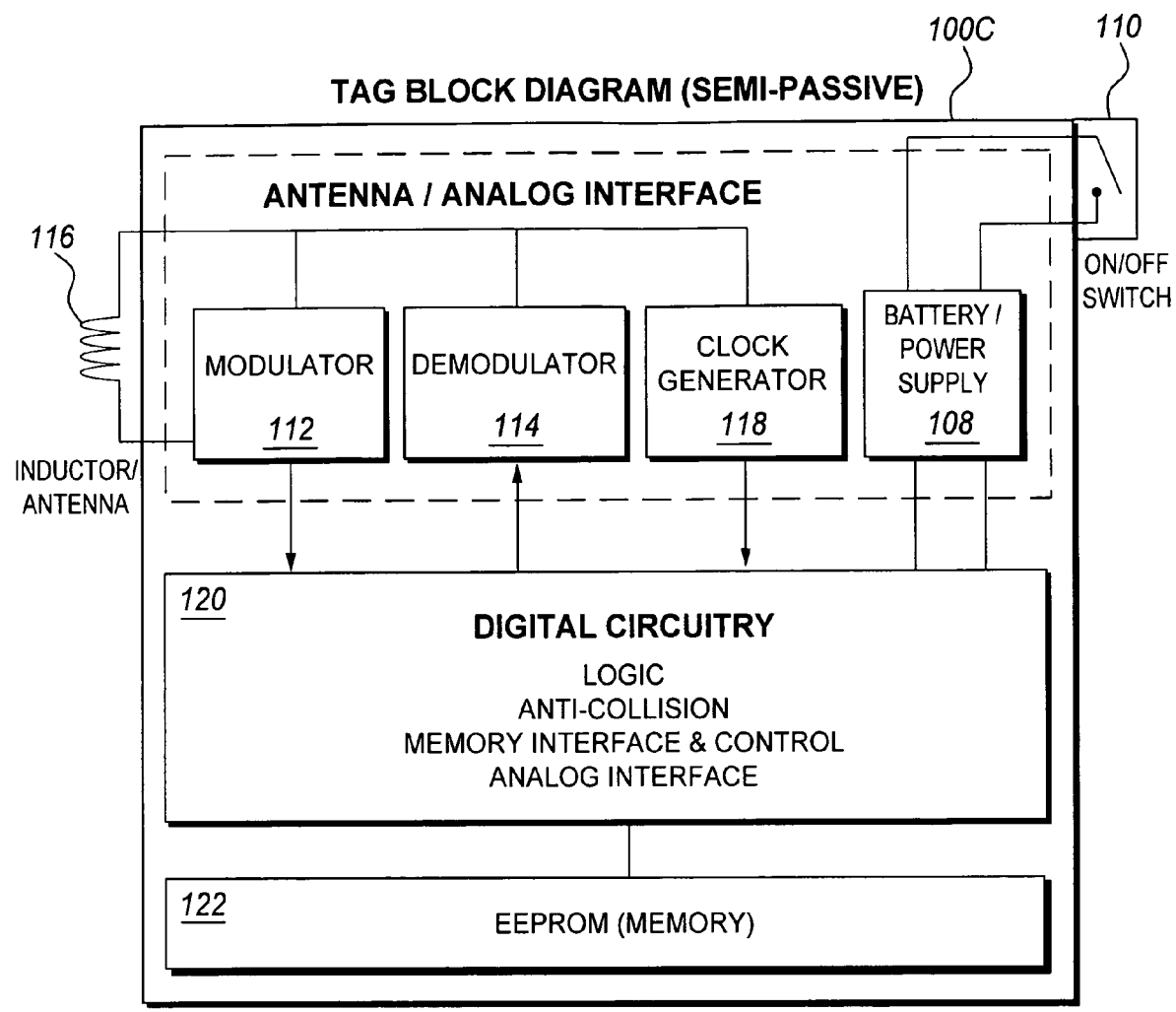
FIG. 3C is a block diagram of an active RFID identification tag for a loss prevention system according to the present invention.

Turning now to FIGS. 3A–3C, a tag 100 contains a semiconductor-based Radio Frequency IDentification (RFID) component including an associated antenna or coil in a configuration that is well known to those skilled in the art. Each tag 100 is programmed with a unique identification code, typically set by the manufacturer to ensure that no two tags have the same code. Tags 100 include passive tags 100A, semi-passive tags 100B, and active tags 100C.

A passive tag 100A, illustrated in FIG. 3A, is the simplest of the tags 100, comprising a semiconductor-based Radio Frequency IDentification (RFID) component along with an associated antenna or coil 116. The RFID component typically includes a receiver/demodulator 114 for receiving and demodulating the RF interrogation signal, and a transmitter/modulator 112 for modulating and transmitting the tag's. RF reply. Additional digital circuitry 120 provides an anti-collision protocol so that multiple tags 100 can be used, along with memory control and other logic functions. A memory 122 stores the tag's unique identification code. The passive tag 100A has no battery, but is powered inductively by the RF energy emitted from the monitor. An inductive power supply and regulator 104, typically including a capacitor connected to the antenna 116, draws and stores enough energy from the received monitor signal to power the circuitry of the passive tag 10A. Because no battery is used, the passive tag 100A is the simplest, smallest and lightest of the tags 100. With no battery, however, the passive tag 100A is the most limited in range because of its limited ability to transmit a response, limitations of the receiver/demodulator 114, and the sensitivity of the monitor 10 to detect weak responses.

A semi-passive tag 100B, illustrated in FIG. 3B, is similar to the passive tag 100A, except that a battery or power source 108 is provided to power the tag 100B. The receiver/demodulator 114 remains un-powered in the absence of a signal from the monitor 10, but a detector/switch 106 and a battery or power supply 108 replace the inductive power supply and regulator 104. In response to inductive energy from the antenna 116, the detector/switch 106 applies the battery/power supply 108 to power the tag's transponder circuits, including the transmitter/modulator 112, to send the tag's response. The semi-passive tag 100B thus remains "dormant" until interrogated by the monitor 10, when the semi-passive tag 100B is powered for a short duration by the battery or power supply 108 to respond to the interrogation. Because the transmitter/modulator 112 is powered by the battery or power supply 108, the semi-passive tag 100B has a greater range that the passive tag 10A. The range of the semi-passive tag 100B remains limited by the ability of the receiver/demodulator 114 to receive a weak signal.

In an active tag 100C, illustrated in FIG. 3C, the battery or power supply 108 powers all of the tag's circuits, including the receiver/demodulator 114. The detector/switch 106 of the semi-passive tag 100B is replaced by a simple on/off switch 110 so that the active tag 100C may be powered on for periods of use, and powered off for periods of non-use. Because the battery-powered receiver/demodulator 114 of the active tag 100C has greater sensitivity than a receiver/demodulator that relies on a received signal for power, the active tag 100C has a greater range than either the passive tag 100A or the semi-passive tag 100B.

Using either the passive tags 100A, semi-passive tags 100B, or active tags 100C, the monitor 10 can track various articles within a close range (using a passive tag 100), a medium range (using a semi-passive tag 100B), and a relatively longer range (using an active tag 100C). Thus, a user might, for example, tag a tagged wallet with a passive tag 100A and a briefcase with an active tag 100C so that the wallet's passive tag 100A triggers an alarm if the wallet falls from the user's pocket, while the briefcase's active tag 100C will not cause an alarm until the user has left the briefcase a significant distance behind. Depending on cost/performance tradeoffs made during design of the monitor 10, the present invention may use a low cost and low sensitivity version of a monitor 10 and require semi-passive tags 100B or active tags 100C, whereas a higher cost, more sensitive monitor 10 could function exclusively with less costly passive tags 100A.

A user operates the monitor 10 to learn, or "acquire" one or more tags 100 that the user attaches to various articles that are to be monitored by the loss prevention system. A tag 100 is acquired when the monitor 10 interrogates the tag 100, receives an identification code in reply from the tag 100, and records the identification code in memory 44.

With the tags 100 acquired, the user may place the monitor 10 into a monitoring mode. In the monitoring mode, tags 100 are interrogated by the monitor 10, and each tag 100 within range of the monitor 10 sends a reply that includes the identification code. The monitor 10 receives each reply, and compares the received identification code to the codes stored in memory 44. If a reply is not received for each of the stored identification codes, then an alarm is sounded.

The user may also operate the monitor 10 to "drop" one or more tags 100 that have been acquired, erasing the tag's identification code from memory 44 or otherwise flagging the tag in memory and thus disabling any alarm when the tag's identification code is not found in subsequent polling.

The microcomputer code operates the display 54 and input device 56 to interact with the user, and controls the operation of the monitor 10 to perform monitoring of the tags 100.

Figure 4:
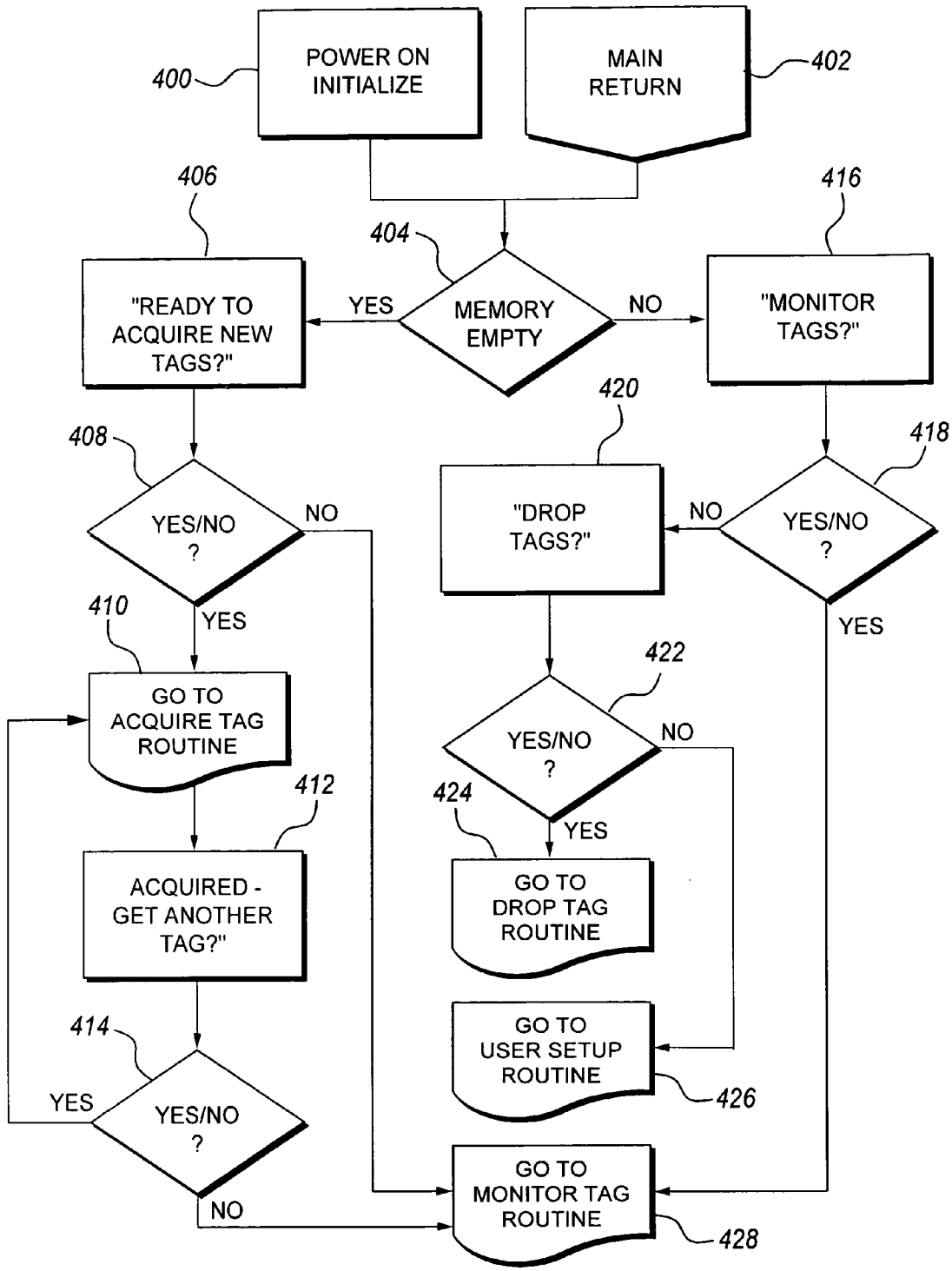
FIG. 4 is a flowchart of a software initialization and startup process for a monitor in a loss prevention system according to the present invention.

Turning now to FIG. 4, the microcomputer code performs a power-on initialization 400 of the monitor 10, and presents the user with a "main menu" of choices for operation of the monitor 10 which can be revisited through the main return 402. The software tracks whether the memory 44 is empty at step 404. The user may select from options to acquire new tags at step 406, monitor tags at step 416, drop tags at step 420, or perform setup functions for the monitor 10.

The software checks whether the user wants to enter new tags at step 408, and if so the user is directed to the acquire tag routine at step 410, and queried as to entering a second new tag at steps 412 and 414. If the user does not want to acquire new tag ID numbers, the user is directed to the monitor tag routing at step 428.

If the user selects monitor tags at step 416, the user may confirm the selection at step 418, in which case the software enters the monitor tag routine, as reflected at step 428; otherwise, the user is queried whether he wishes to drop ID tags from the monitor at steps 420 and 422. If the user wants to eliminate ID tags, the software is directed to the drop tag routine at step 424, or if not, the software enters the user setup routine, as reflected at step 426.

Figure 5:
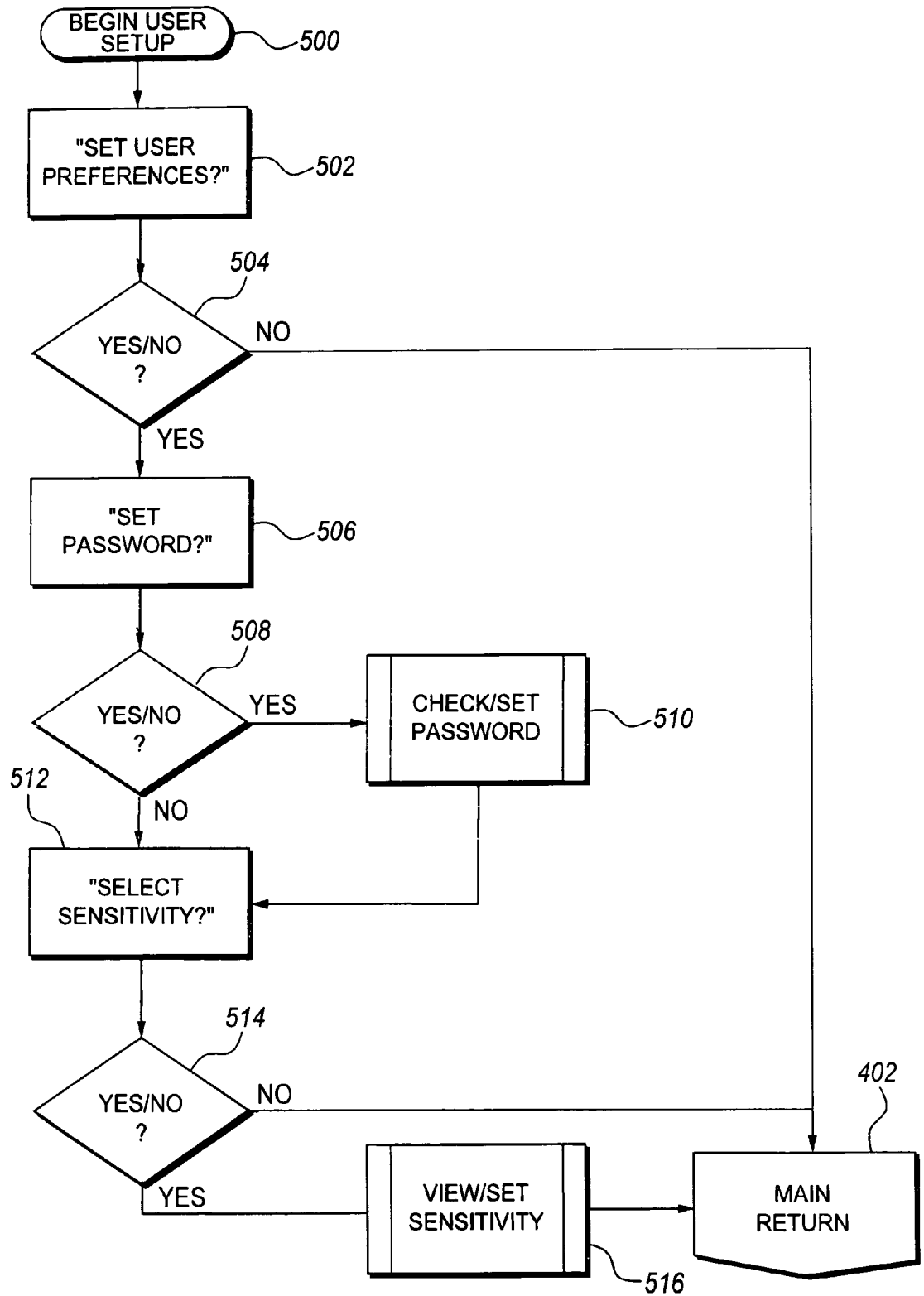
FIG. 5 is a flowchart of a software process for user setup of a monitor in a loss prevention system according to the present invention.

Turning to FIG. 5, the setup functions for the monitor 10 are illustrated. The routine starts at step 500, and queries the user whether he or she wishes to set the user preferences at steps 502 and 504. If not, the software returns to the startup routine of FIG. 4 via the main return 402. If the user does wish to change preferences, the user is queried about setting a password at steps 506 and 508. If the user does wish to set a password, the software enters a routine to check and/or set a password at step 510, otherwise the software queries the user about setting the sensitivity of the monitor at step 512. If the user wishes to set the selectivity, the software enters the view and/or set sensitivity routine at step 516, or if not, the software re-enters the startup routine of FIG. 4 via main return 402. The monitor sensitivity is set by varying the transmitter 22 power and the receiver 32 sensitivity. The user may control both to achieve an optimal or preferred function of the monitor 10.

Figure 6:
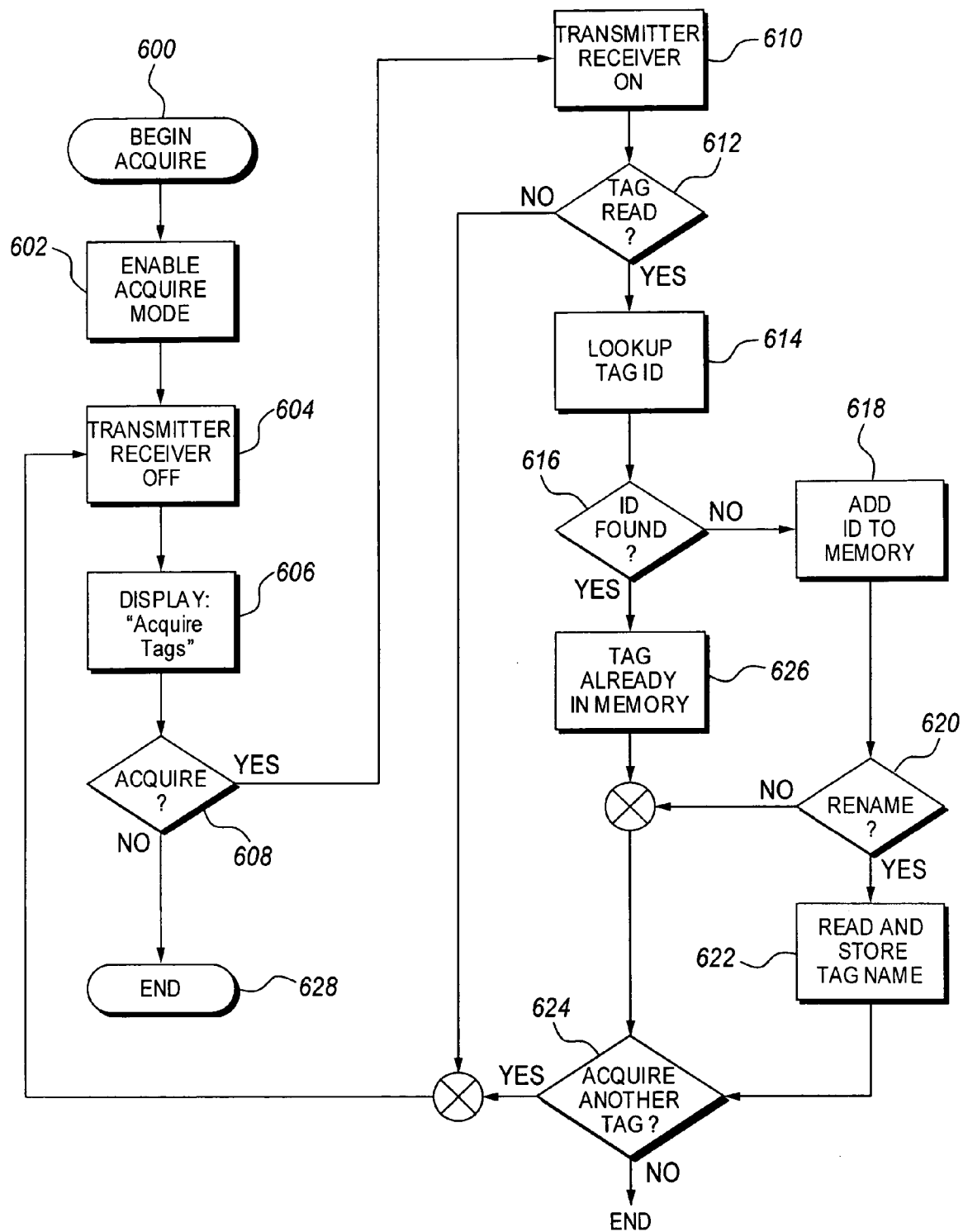
FIG. 6 is a flowchart of a software process for acquiring tags by a monitor in a loss prevention system according to the present invention.

Turning now to FIG. 6, a process for acquiring tags 100 is described. The monitor 10 will acquire a tag 100 that is in the "near vicinity" of the monitor. In practice, this may be accomplished through several methods. The monitor 10 may transmit at a lower-than-normal power level (e.g. 25%) so that it only communicates with a tag 100 placed next to it, so the monitor does not interact with any other tags 100 otherwise within its normal operating range. Alternatively, the monitor 10 may operate at its normal power level, but process only a tag 100 with the strongest signal. According to another method, the monitor 10 simply "mutes", or ignores, any tag 100 that has already been acquired. In another method, the monitor 10 uses a very specific directional antenna to communicate with a tag 100 that is placed in a specific location relative to the monitor so that the likelihood of another tag 100 responding to the monitor 10 is relatively low.

On entry into a tag acquisition mode at step 600, the microcomputer code enables the acquire mode at step 602 and turns off the transmitter 22 and the receiver 32 until the user is ready to proceed and acquire a tag 100 at step 604. The user is prompted to acquire a tag 100 at step 606, whereupon the user places a tag 100 to be acquired in the near vicinity of the monitor 10, in a manner as discussed above. If the user selects to proceed and acquire a tag 100 at step 608, the microcontroller 40 powers on the monitor's transmitter 22 and receiver 32 to interrogate a tag 100 that is in the near vicinity of the monitor as described above at step 610, otherwise the routine ends at step 628. If the monitor's receiver 32 receives a reply from a tag 100, the identification code is extracted from the reply at step 612, or if no tag is read, the software re-enters the acquire tag routine at step 604. The microcomputer code compares the received identification code against those already stored in memory 44 at steps 614 and 616, and if the identification code is not present in the memory 44, the identification code is stored at step 618, or if already stored in memory at 626, the user is prompted whether to acquire another tag at step 624.

With the identification code for the acquired tag 100 stored in memory, the user may choose to associate an alias or a name to the identification code to identify the article that the tag 100 will be affixed to at step 620. If the user chooses to rename the tag 100, the user enters an alias that is then stored in memory 44 along with the identification code at step 622. Once a tag 100 has been acquired, the user may elect to acquire additional tags at step 624, or to return the monitor 10 to a main menu or a main operating mode.

Figure 7:
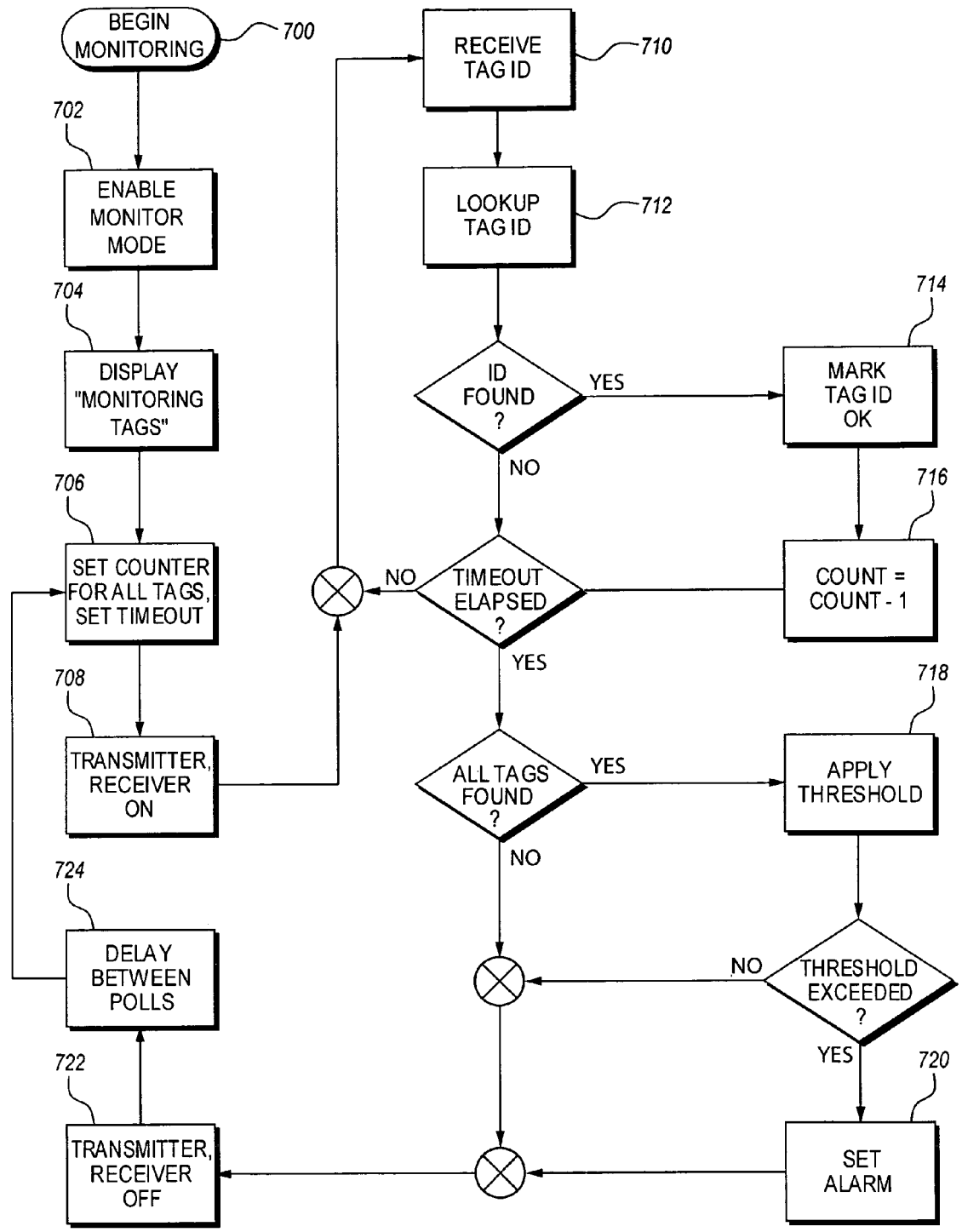
FIG. 7 is a flowchart of a software process for monitoring tags by a monitor in a loss prevention system according to the present invention.

Once the monitor 10 has acquired one or more tags 100, the monitor 10 may be placed in a monitoring mode. Turning now to FIG. 7, a process for monitoring tags 100 is described. The monitor 10 routine begins at step 700, by enabling the monitor mode at step 702, which causes the monitor 10 to display an appropriate message at step 704. The monitor 10 tracks all of the tags 100 that have been acquired, or a subset of these tags 100 if some of the acquired tags 100 have been disabled or "dropped" by the user. The microcomputer code begins an interrogation cycle, setting a counter for the number of tags 100 to monitor and setting a timeout interval for completion of the interrogation cycle, as indicated at step 706. The RF circuitry 20 is then powered on as indicated at 708, enabling the transmitter 22 to broadcast an interrogation signal to all tags 100 within range, including tags that have been disabled or dropped, and those tags 100 that have not yet been acquired.

As tags 100 that are within range of the transmitter 22 respond to the interrogation, the identification codes from the various tags 100 are received, at step 710. When an identification code is received, the microcomputer code compares the received identification code with identification codes stored in memory 44 at step 712. When a received identification code matches a code in the memory 44, the identification code in memory is marked as "present" at step 714, indicating that the corresponding tag 100 answered the interrogation, and the counter of remaining tags is decremented at step 716.

Once the timeout interval has elapsed, the microcomputer code determines if all of the acquired tags 100 have responded. If one or more acquired tags 100 have not responded, then at step 718 each of the non-responding tags 100 is subjected to a threshold test to determine if an alarm is to be set. The threshold test determines if a tag 100 has failed to respond to a predetermined number of consecutive interrogations, or has failed to respond to interrogations for a predetermined time interval. The threshold test insures that no false alarm is issued for a tag 100 that, although within range of the monitor 10, for some reason fails to respond to a single or small number of interrogations. The threshold test may also identify tags 100 that are prone to occasionally missed replies, which may indicate a failing or incorrectly functioning tag 100, such as where a tag 100 consistently misses replies but below the threshold level required for an alarm.

If the threshold is exceeded for a tag 100, an alarm is set at step 720. In addition to the alarm, the monitor 10 may display a message to indicate to the user which of the tagged articles is associated with the alarm.

After the interrogation cycle is completed, the transmitter 22 is turned off, step 722, and following a short time delay, step 724, the interrogation cycle is repeated, step 706.

Tags 100 may be dropped from the monitor 10, for example when the user no longer wants to monitor a particular tagged article, or when the user removes a tag 100 from an article to dispose of the article, thus having a surplus tag 100. When a tag 100 is dropped, its identification code is removed from the monitor's memory 44 so that the tag 100 is no longer known to the monitor 10. A tag 100 may be dropped by selecting its identification code, or its alias, from a list displayed by the monitor 10, and entering a "drop" command. Alternatively, a tag 100 may be dropped by a process similar to the acquisition process, wherein the monitor 10 is placed into a "drop" mode and the tag 100 to be dropped is placed in the near vicinity of the monitor 10.

Figure 8:
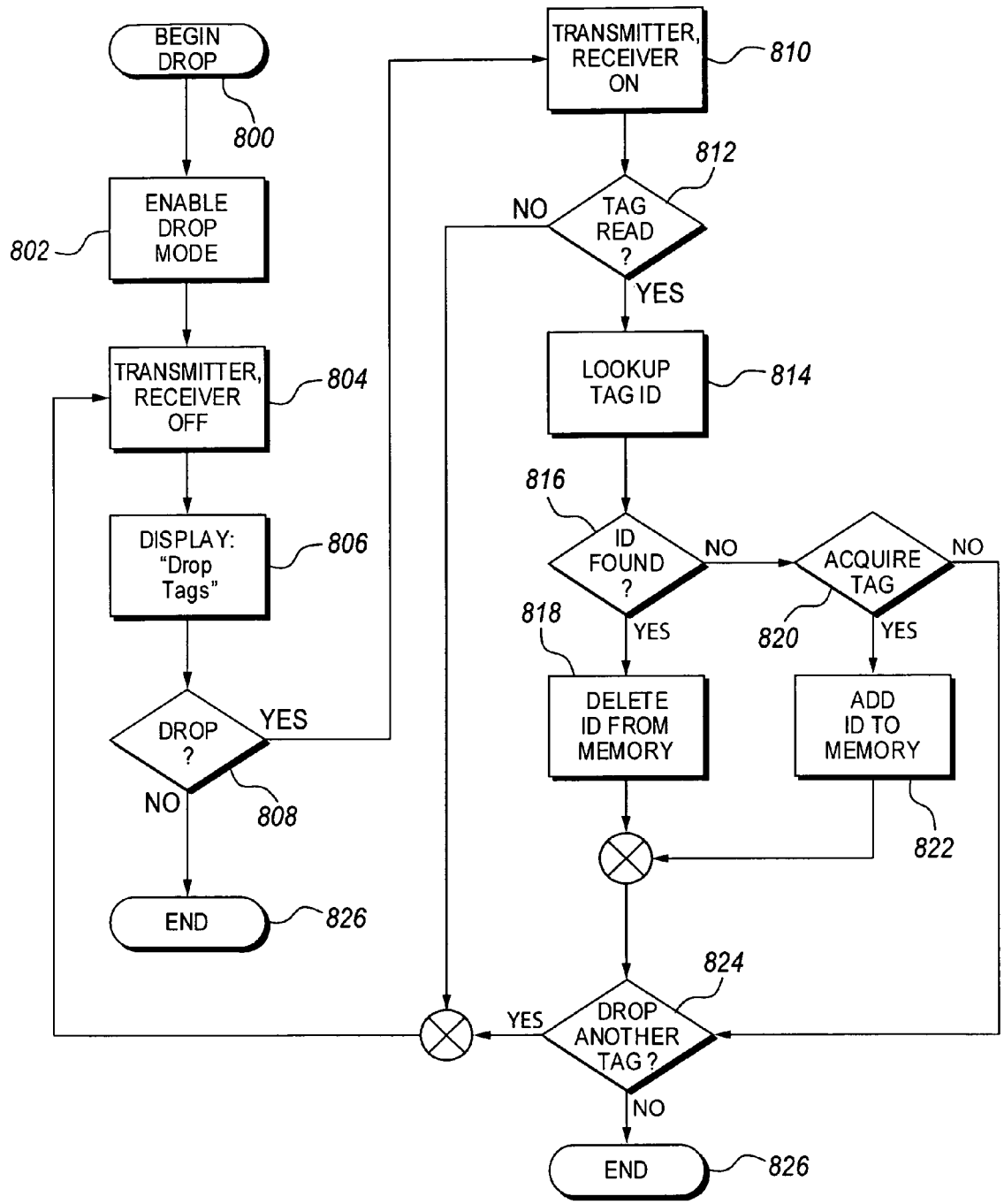
FIG. 8 is a flowchart of a software process for dropping tags from a monitor in a loss prevention system according to the present invention.

Turning now to FIG. 8, a process for dropping tags 100 is described. The drop tag routine begins at step 800, and proceeds to enable the drop mode, step 802. The monitor 10 will drop a tag 100 that is placed in the "near vicinity" of the monitor 10, as described above. On entry into a tag dropping mode, the microcomputer code turns off the transmitter 22 and the receiver 32 until the user is ready to proceed to drop a tag 100, as indicated at step 804. The user is prompted to drop a tag 100, step 806, whereupon the user places a tag 100 to be dropped in the near vicinity of the monitor 10, in a manner as discussed above. If the software detects, at step 808, that the user selects to proceed to drop a tag 100, the microcontroller 40 powers on the monitor's transmitter 22 and receiver 32, step 810, to interrogate a tag 100 that is in the near vicinity of the monitor as described above. If the monitor's receiver 32 receives a reply from a tag 100, the identification code is extracted from the reply. If the tag has been read, step 812, the microcomputer code compares the received identification code against those already stored in memory 44, step 814, and if the identification code is found present in the memory 44, step 816, the identification code is deleted or otherwise flagged at step 818, thus dropping the tag 100. If the identification code is not found in the memory 44, the user is presented with the option to acquire the tag 100 at step 820, adding the identification code to the memory 44, step 822, as in the acquisition process discussed above. The user is prompted at step 824 to indicate whether another tag 100 is to be dropped. If yes, the process is reiterated beginning at step 804; otherwise the drop tag routine ends at step 826 by returning to the power-up main menu of FIG. 4.

With an understanding of an RFID embodiment of the loss prevention system, it can be appreciated that the system may be implemented with alternative technologies. What is important is that the monitor 10 has the ability to determine when a tag 100 has moved beyond a limited range of communication with the monitor 10. An ideal alternative technology is the Bluetooth wireless personal area network (WPAN) based on the IEEE standard 802.15.1.

The personal area network is for devices within or moving into a "personal operating space" (POS) of a person; typical range of operation is from one to ten meters. It is based on the Bluetooth PAN technology, but is a lower power, low cost wireless technology that can be used in cell phones, pagers, computers, bio-monitoring devices, as well as printers, sensors, displays, and more.

Figure 2C:
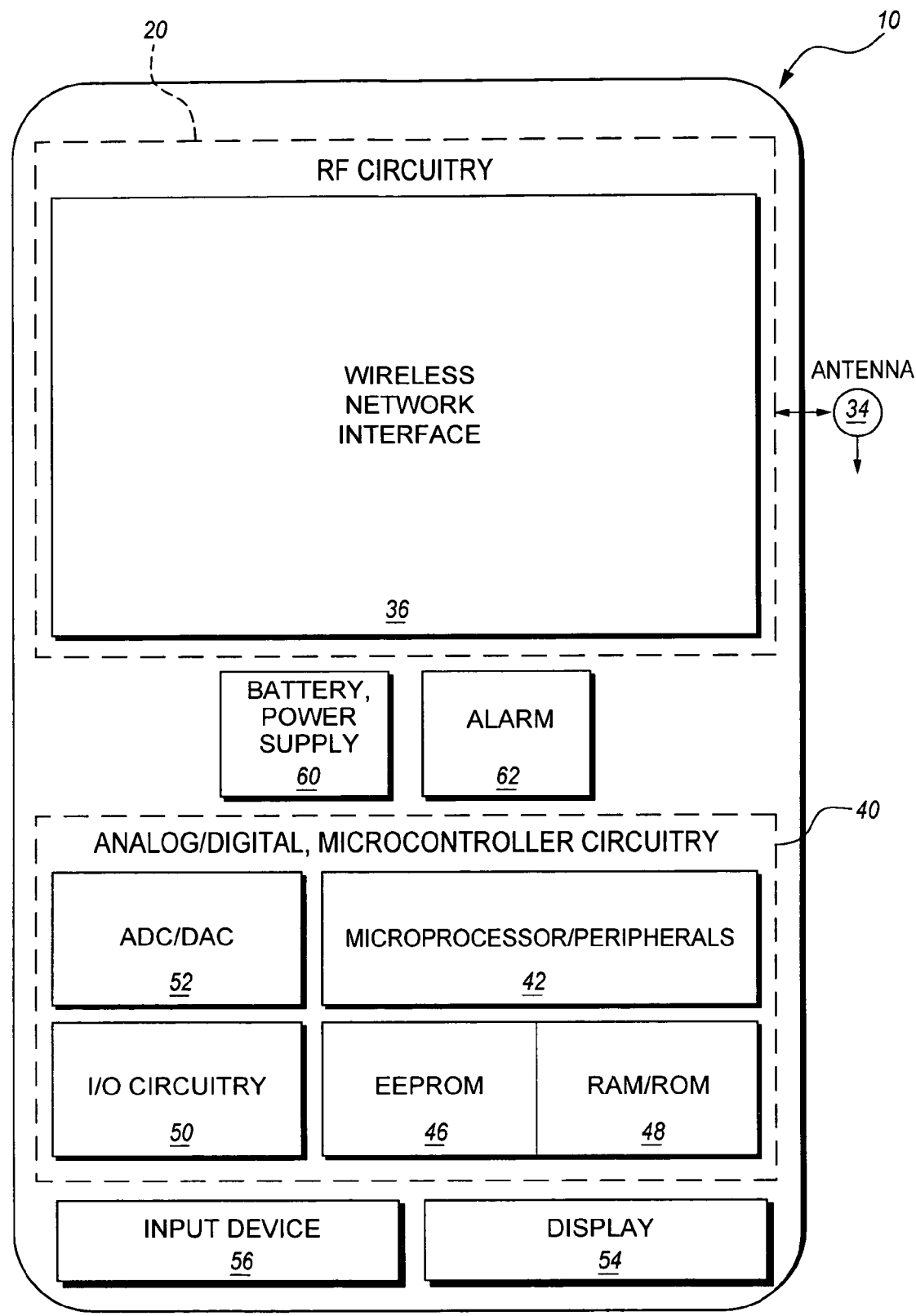
FIG. 2C is a block diagram of a monitor for a loss prevention system according to the present invention using a wireless network interface.
Figure 3D:
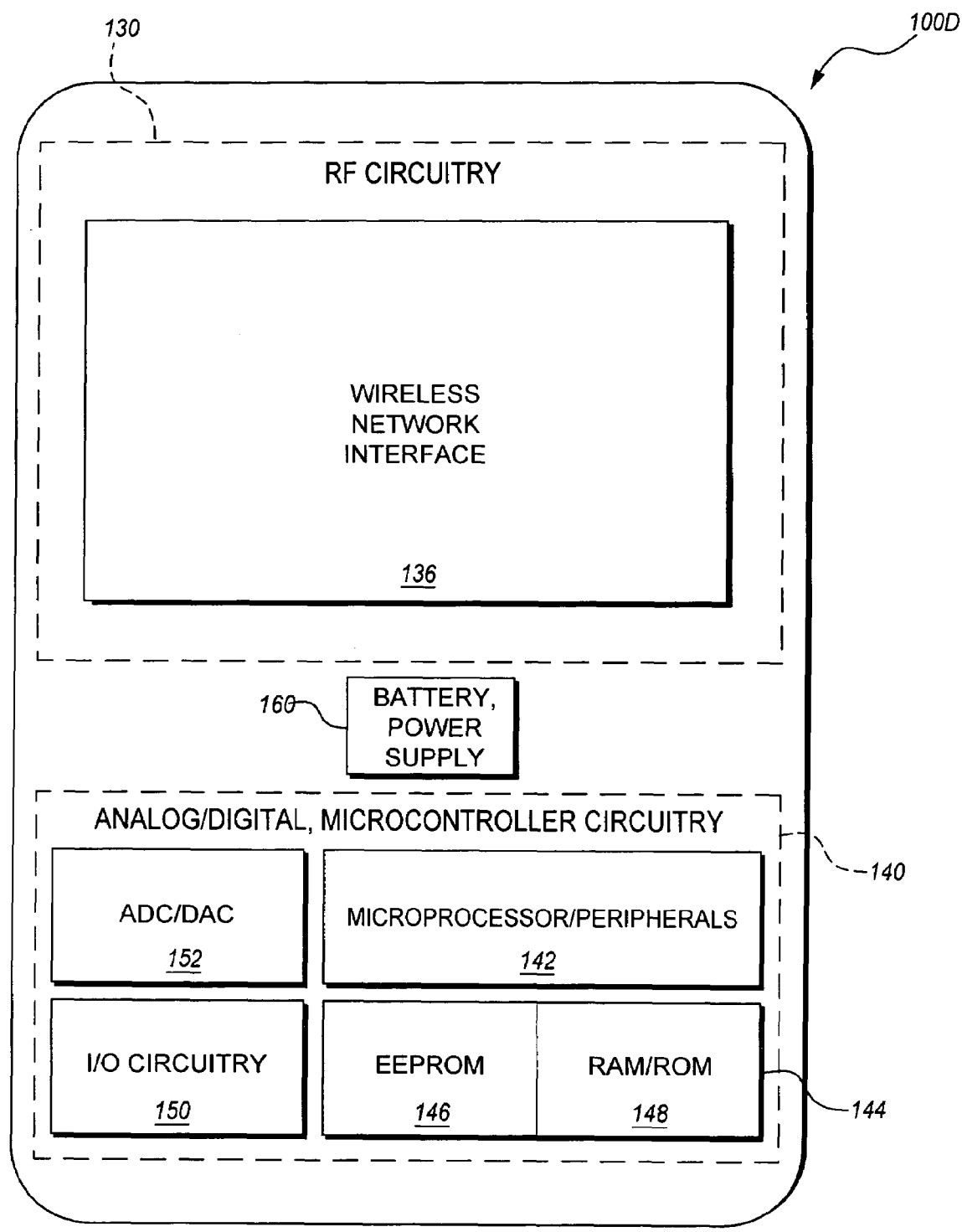
FIG. 3D is a block diagram of an identification tag for a loss prevention system according to the present invention using a wireless network interface.

In a WPAN implementation of the monitor 10, shown in FIG. 2C, the RF circuitry 20 includes a WPAN wireless network interface 36. Similarly, referring to FIG. 3D, a tag 100D according to the WPAN implementation can be any device that includes a WPAN wireless network interface 136. Typically, such a device includes control circuitry 140, such as a microprocessor 142 and memory 144, including random access and read only memory (RAM/ROM) 148, and an electrically erasable programmable read only memory (EEPROM) 146. The control circuitry 140 may also include I/O circuitry 150, and analog-to-digital and digital-to-analog converters (ADC/DAC) 152. The control circuitry 140 is typically implemented with a micro-controller device wherein the above-described circuitry is combined within a single integrated circuit or device. A power supply or battery 160 powers the tag 100D.

Figure 9A:
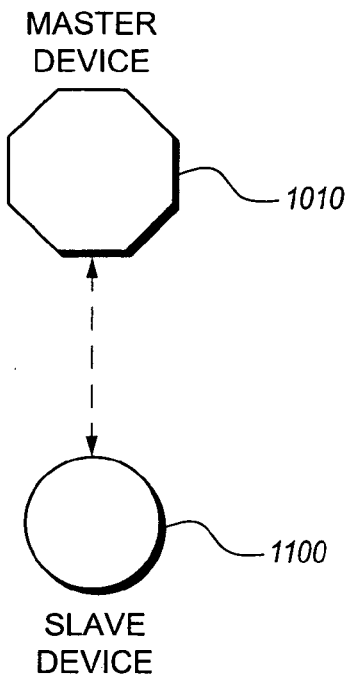
FIG. 9A is a single-slave piconet topology for a wireless network embodiment of a loss prevention system according to the present invention.
Figure 9B:
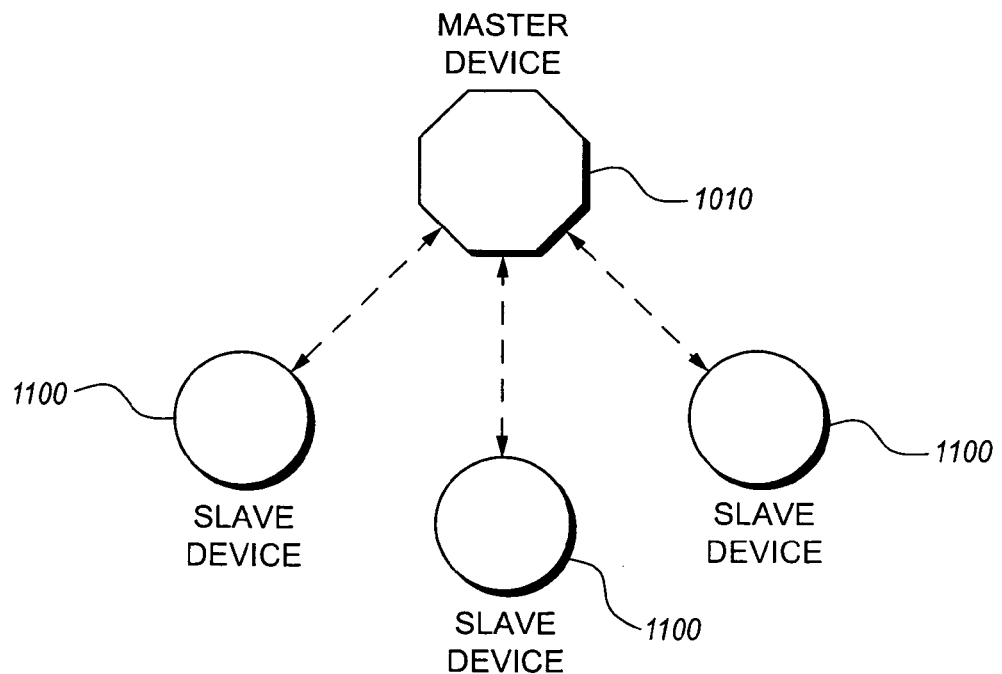
FIG. 9B is a multiple-slave piconet topology for a wireless network embodiment of a loss prevention system according to the present invention.
Figure 9C:
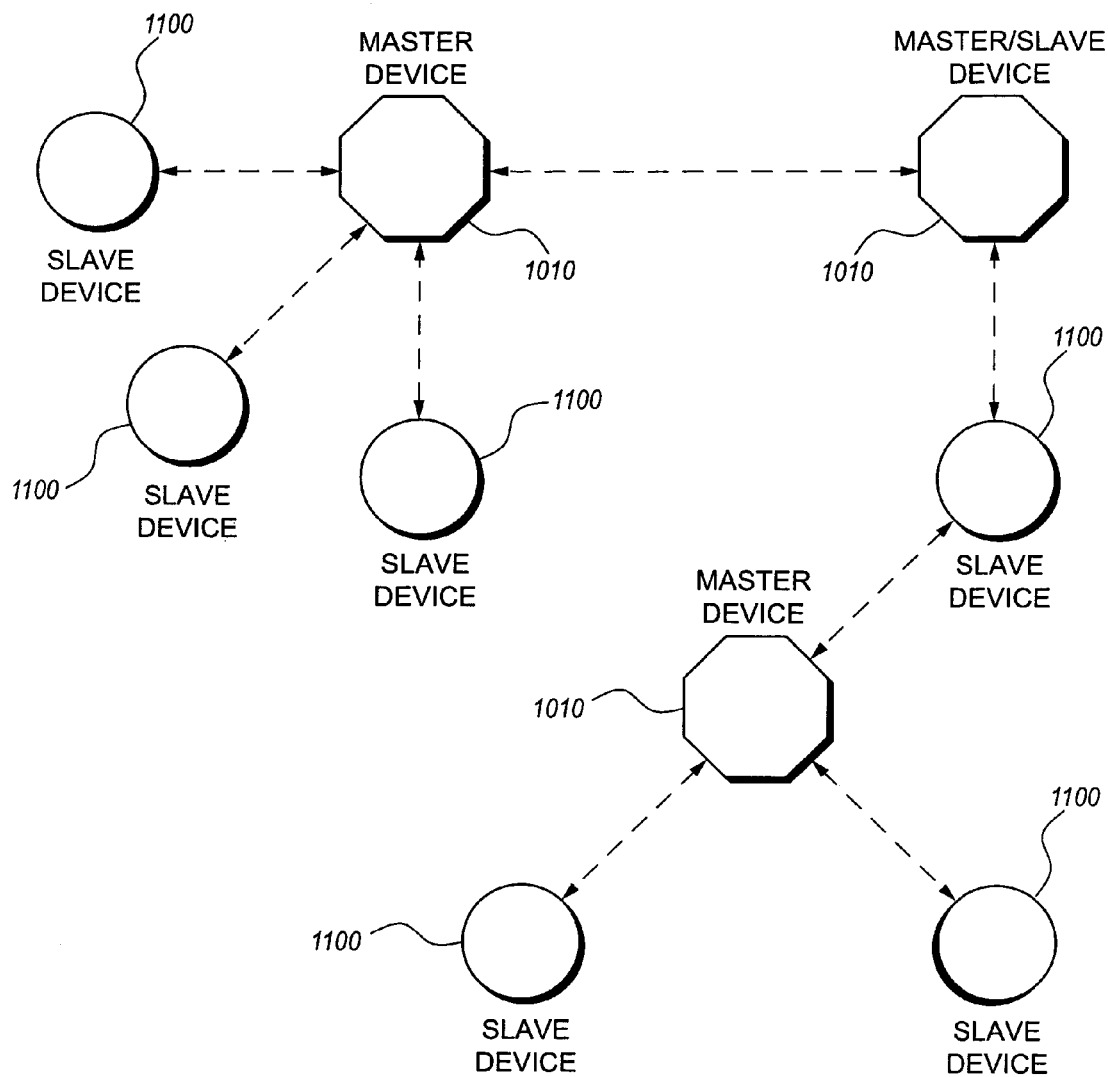
FIG. 9C is a scatter-net topology for a wireless network embodiment of a loss prevention system according to the present invention.

Turning now to FIGS. 9A–9C, WPAN-enabled devices communicate with one another in a simple network configuration wherein, typically, one or more devices act as a master 1010 while one or more devices act as slaves 1100. In the simplest arrangement, shown in FIG. 9A, a single slave 1100 communicates with a single master 1010. Referring to FIG. 9B, multiple slaves 1100 can communicate with a single master 1010. Configurations that include a single master and up to eight slaves are referred to as a "piconet" topology, while in a "scatternet" topology, as seen in FIG. 9C, the network may include multiple masters 1010 along with multiple slaves 1100. The scatternet topology allows communication between masters 1010, as well as communication by a slave 1100.to more than one master 1010. In either topology, WPAN devices join a network on an ad-hoc basis. A master 1010 may detect that a device is active within the personal operating space, and invite the device to connect with the master 1010 and join the network.

It can now be appreciated that a WPAN piconet mirrors the architecture of the RFID loss prevention system described above, with the single master (TBD) filling the role of the monitor 10, and at least one slave (TBD) filling the role of the tag 100. Thus, software installed on a monitor that incorporates a WPAN wireless network interface will perform functions that are similar to those described above, including acquisition, monitoring, and dropping of WPAN slave devices, along with user interface functions related to setup and operation of the monitor 10.

Additionally, with a WPAN implementation of the loss prevention system, multiple monitors can communicate with one another in a scatternet topology, allowing WPAN tags 100D to be "handed off" from one monitor 10 to another. This allows monitored articles to be easily passed from one individual to another, where each individual is carrying a monitor 10 that can, by communication and coordination with the other individual's monitor 10, coordinate the transfer of monitoring responsibility. Additionally, monitored articles can be easily moved from one monitored environment, such as an individual's home or office where the articles are monitored by a fixed monitor, to another environment, such as a mobile environment, in which the articles are monitored by a portable monitor 10.

It is to be understood that the present invention is not limited to the embodiments described above, but encompasses any and all embodiments within the scope of the following claims.

We claim:

1. A monitor for a loss prevention system, comprising:
   an RF communication circuit adapted for communication with at least one radio frequency identification tag;
   a control circuit having a microprocessor and a memory, the control circuit being electrically connected to the RF communication circuit;
   an alarm electrically connected to the microprocessor; and
   a computer readable program code stored in the memory and executing under control of the microprocessor, the program code having;
   means for acquiring the identification tag by storing a unique identifier associated with the identification tag in the memory and associating the identifier with an alias:
   means for dropping the identification tag by deleting the unique identifier associated with the identification tag from the memory;
   means for operating the RF communication circuit to interrogate the identification tag;
   means for causing the alarm to activate when the identification tag is out of range of the RF communication circuit; and
   means for dropping the identification tag by deleting the unique identifier associated with the identification tag from the memory;
   wherein said means for operating systematically polls each at least one identification tag, and said means for dropping deletes the unique identifier upon subsequent polling when the identification tag is determined out of range.

2. The monitor for a loss prevention system according to claim 1, wherein said RF communication circuit comprises a wireless network interface adapter.

3. The monitor for a loss prevention system according to claim 1, wherein said RF communication circuit comprises:
   transmitting means for broadcasting an RF signal to the radio frequency identification tag; and
   receiving means for receiving an RF signal from the radio frequency identification tag.

4. The monitor for a loss prevention system according to claim 3, further comprising adjusting means for adjusting the sensitivity of said receiving means.

5. The monitor for a loss prevention system according to claim 3, further comprising adjusting means for adjusting the signal strength of said transmitting means.

6. The monitor for a loss prevention system according to claim 1, further comprising a housing containing said RF communication circuit and said control circuit.

7. The monitor for a loss prevention system according to claim 6, further comprising a belt clip.

8. The monitor for a loss prevention system according to claim 1, further comprising user interface means for displaying messages to and receiving input from a user, the user interface means being electrically connected to said control circuit.

9. The monitor for a loss prevention system according to claim 8, further comprising a housing containing said RF communication circuit, said control circuit, and said user interface means.

10. The monitor for a loss prevention system according to claim 9, further comprising a belt clip.

11. The monitor for a loss prevention system according to claim 1, wherein said program code further comprises adjusting means for adjusting the sensitivity of said RF communication circuit.

12. The monitor for a loss prevention system according to claim 1, wherein said alarm is an audible alarm.

13. The monitor for a loss prevention system according to claim 1, wherein said alarm is a visual alarm.

14. The monitor for a loss prevention system according to claim 1, wherein said alarm is a tactile alarm.

15. The monitor for a loss prevention system according to claim 1, wherein said program code further comprises means for controlling an operating range of said RF communication circuit.

16. The monitor for a loss prevention system according to claim 1, wherein said program code further comprises means for dropping the identification tag.

17. A loss prevention system, comprising:
   (a) a monitor having:
      (i) a control circuit including a microprocessor and a memory;
      (ii) a radio frequency communication circuit connected to the control circuit, including a transmitter and a receiver;
      (iii) program code stored in the control circuit memory and executing under control of the microprocessor, the program code including:
         (A) means for causing an interrogation signal to be transmitted by the transmitter;
         (B) means for acquiring an identification tag number from a response to the interrogation signal, including storing the acquired tag number and associating an alias with the acquired tag number;
(C) means for repetitively transmitting the interrogation signal, and for tracking responses to the interrogation signal, including comparing responses to the acquired tag number;
(D) means for generating an alarm when the tracked responses fail to include the acquired tag number; and
(E) means for dropping the acquired identification tag number from memory;
   wherein said means for dropping deletes the acquired tag number upon the repetitive tracking when subsequent tracked responses fails to include the acquired tag number; and
(b) at least one radio frequency identification tag adapted for attachment to an article to be tracked, the tag having:

(i) a memory having a unique identification number stored therein; and
(ii) transponder means for receiving the interrogation signal transmitted by the monitor and transmitting the unique identification number in response to the interrogation signal.

18. The loss prevention system according to claim 17, further comprising a housing, said RF communication circuit and said control circuit being disposed within the housing, the housing being dimensioned and configured for transport upon a user's person, whereby said monitor is portable.

19. The loss prevention system according to claim 17, wherein said monitor and said radio frequency identification tag both further comprise means for communication in a wireless personal area network.

* * * * *